UNITED STATES PATENT OFFICE.

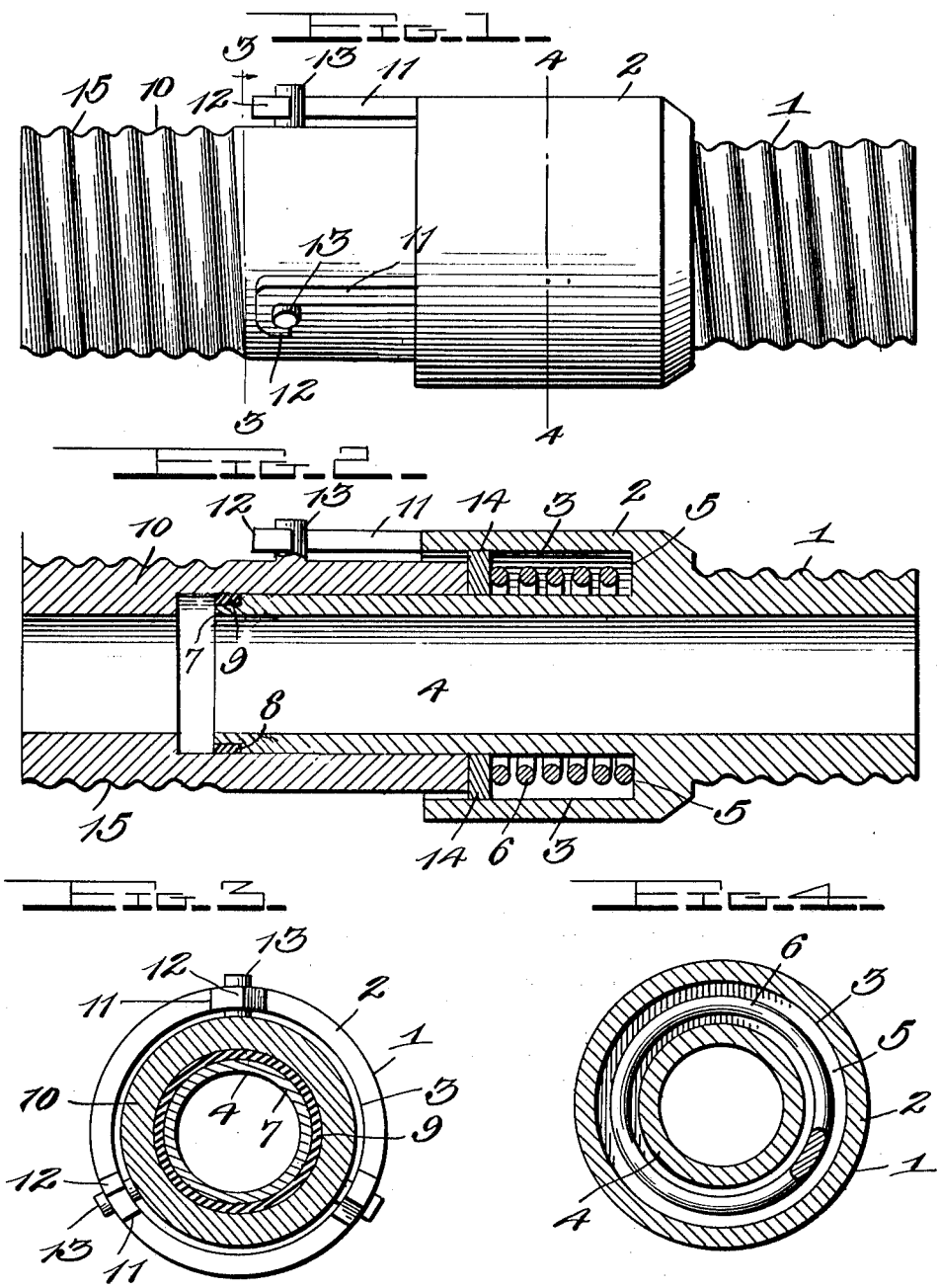

JOHN J. DANBERG, OF BEACH, NORTH DAKOTA, ASSIGNOR OF ONE-HALF TO JOHN PIERZINA, OF BEACH, NORTH DAKOTA.

HOSE-COUPLING.

1,051,805.  Specification of Letters Patent.  Patented Jan. 28, 1913.

Application filed April 20, 1912. Serial No. 692,091.

*To all whom it may concern:*

Be it known that I, JOHN J. DANBERG, a citizen of the United States, residing at Beach, in the county of Billings and State of North Dakota, have invented certain new and useful Improvements in Hose-Couplings, of which the following is a specification, reference being had to the accompanying drawings.

This invention relates to new and useful improvements in hose-couplings, the object of the invention being to provide an effective and inexpensive device for readily connecting and disconnecting sections of a pipe or hose.

Another object of the invention is to provide a detachable hose coupling which will possess advantages in points of efficiency and durability, is inexpensive of manufacture and at the same time is simple in construction and operation. With the above and other objects in view the invention consists in the novel features of construction and the combination and arrangement of parts hereinafter more fully described, pointed out in the claim, and shown in the accompanying drawings in which, Figure 1 is a side elevation of my improved coupling. Fig. 2 is a longitudinal sectional view. Fig. 3 is a transverse sectional view on the line 3—3 of Fig. 1, and Fig. 4 is a similar view on the line 4—4 of Fig. 1.

Referring more particularly to the drawings, 1 indicates the female member which comprises an externally-corrugated pipe 1, provided with an enlarged portion 2 formed intermediate of its length. The enlarged portion 2 is provided with a circular chamber 3 in which is disposed the reduced end 4 of the member 1, a shoulder 5 being formed at the inner end of the chamber 3 and adapted to encircle the inner end of the reduced portion 4. Arranged within the chamber 3, encircling the reduced portion 4 and resting upon the shoulder 5 is a coil spring 6. The reduced portion 4 is formed with a continuous smooth and uninterrupted exterior surface and extends half its length beyond the outer end of the enlarged portion 2 and is provided with a reduced end 7 adapted to form an annular shoulder 8. Mounted upon the reduced end 7 and resting on the shoulder 8 is a rubber washer 9 which is adapted to frictionally engage with the inner walls of the male coupling member 10 to prevent water or other liquids from entering the chamber 3.

Formed integral with the outer end of the enlarged portion 2 and projecting outwardly in alinement therewith are the arms 11 which are arranged in spaced relation and are laterally extended at their outer ends and returned upon themselves for a short distance to form rearwardly facing hook members 12 adapted to engage with the equidistant pins 13 formed upon the outer periphery of the male coupling member. Arranged between the inner end of the male coupling 10 and the spring 6 is a washer 14 which may be of rubber or other suitable elastic material to prevent the leakage of any water which might enter the chamber 3. The male coupling member 10 is provided with a corrugated portion 15 to which is secured one of the hose sections.

From the above it will be seen that I have shown and described the coupling adapted for use in connecting two sections of hose but it will be understood that the coupling can be readily modified so that two sections of pipe or other tubular members can be connected together by the use of my improved coupling.

From the above description taken in connection with the drawings the utility and operation of the coupling will be readily understood. In connecting two sections of hose the male member 10 is first engaged with the reduced portion of the pipe 1, the member is then pushed inwardly into the chamber 3 and at the same time compressing the spring 6. The male member 10 is pushed inwardly until the pins 13 will engage beneath the hook members 12 by the partial rotation of the member 10. The washers 9 and 13 will insure a water tight connection and it will be readily apparent that the coupling members may quickly and easily be connected and disconnected.

What I claim is:—

A hose coupling, comprising mating members, one of which is formed with an enlarged portion and a reduced portion within the enlarged portion and extending beyond the latter, the exterior of the said reduced portion being entirely smooth and uninterrupted throughout its length and the enlarged portion being formed with a plurality of integral longitudinally projecting arms, the extremities of which are turned laterally and thence returned to form rearwardly facing hooks, the other member being formed with radially projecting pins designed for engagement by said hooks and adapted to slip in between the reduced portion of the first named member and the enlarged portion thereof and to snugly fit the reduced portion, a washer adapted to be slipped over the said reduced portion, and an expansion spring mounted in the space between the said reduced portion and the enlarged portion of the first named member and bearing against said washer, for the purpose specified.

In testimony whereof I hereunto affix my signature in the presence of two witnesses.

JOHN J. DANBERG.

Witnesses:
JOHN PIERZINA,
O. C. KUCHEMAN.